May 13, 1924.
P. STOFT
FISHING REEL GUIDE
Filed Sept. 15, 1922
1,494,035
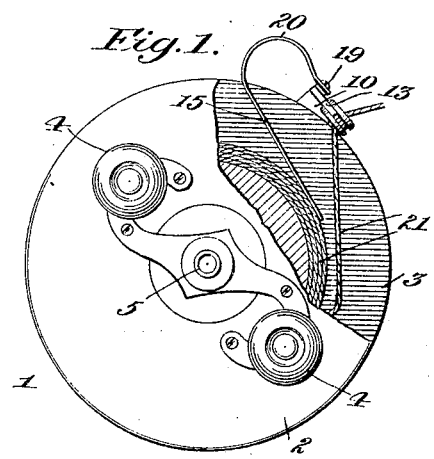
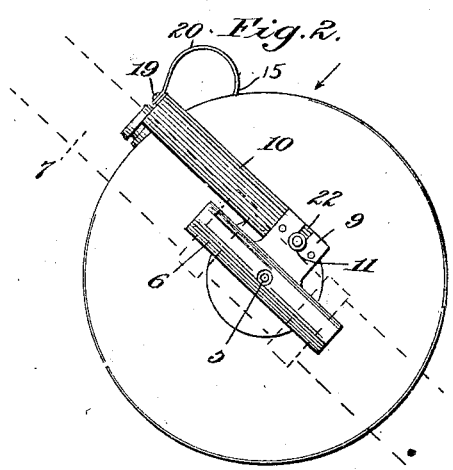
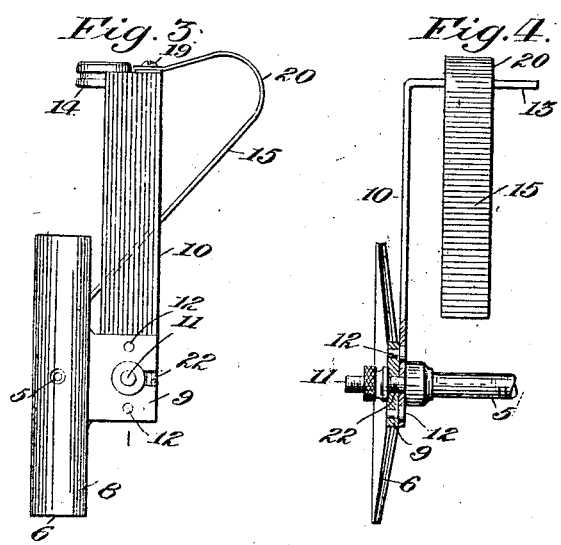
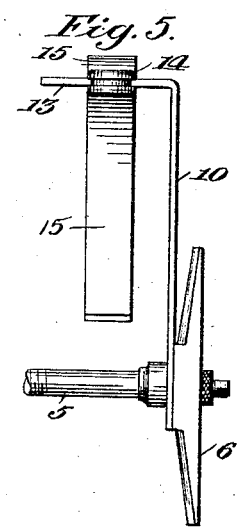
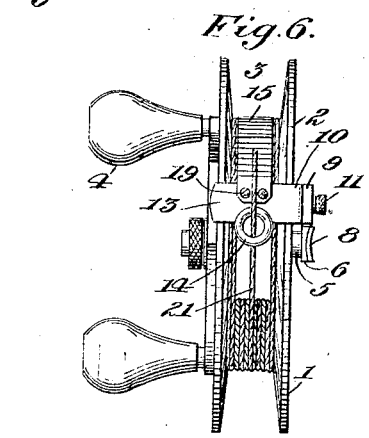
Inventor:
Peter Stoft,
By Frederick V. Winter,
Att'y.

Patented May 13, 1924.

1,494,035

UNITED STATES PATENT OFFICE.

PETER STOFT, OF BROOKLYN, NEW YORK.

FISHING-REEL GUIDE.

Application filed September 15, 1922. Serial No. 588,397.

*To all whom it may concern:*

Be it known that I, PETER STOFT, a citizen of the United States, and resident of borough of Brooklyn, New York city, in the county of Kings and State of New York, have invented certain new and useful Improvements in Fishing-Reel Guides, of which the following is a full, clear, and exact specification.

This invention relates to fishing pole reels, and has for its object to provide an improved attachment for such reels by means of which the line may be guided onto the reel and snugly wound thereon.

It is a particular object of the invention to mount the guide and drag spring on a single attachment which may be readily connected to a reel spindle and rigidly supported in proper relation to the reel. Other objects will appear as the description proceeds.

The invention will be first hereinafter described in connection with the accompanying drawings, which constitute part of this specification, and then more specifically defined in the claims at the end of the description.

In the accompanying drawings, wherein similar reference characters are used to designate corresponding parts throughout the several views:—

Figure 1 is a side view of a fishing reel with my improved attachment applied thereto, part of the reel being broken away to show how the drag spring is arranged in the groove thereof.

Figure 2 is an opposite side view of the reel and the supporting means for the attachment, the fishing pole being indicated in dotted lines.

Figure 3 is a side view of the attachment alone drawn to a larger scale.

Figures 4 and 5 are views of the attachment as it appears from opposite sides of Figure 3, a portion of the reel spindle being shown but the reel itself omitted, and a part of the attachment being shown in section in Figure 4 to indicate how the bracket for supporting the guide and drag spring is rigidly secured to the pole engaging plate, and Figure 6 is an edge view of the reel and attachment looking in the direction indicated by the arrow in Figure 2.

The reel 1 may be of any known type and as shown comprises the circular body 2 having the annular groove 3 in its periphery and a pair of handles or knobs 4 on one side. Said reel is mounted to rotate freely on a spindle 5 having a plate 6 rigidly fixed to one end thereof for atachment to a fishing pole, indicated in dotted lines at 7 in Figure 2, in any suitable manner. The plate 6 is channeled at 8 to fit the curved contour of the pole, as will be readily understood.

The plate 6 has a rigid lateral wing 9 extending therefrom in line with the point of connection of the reel spindle therewith. A bracket 10 is rigidly connected to said wing 9 by a bolt 11 engaging a slot 22 in the wing and a pair of pins 12 protruding from said bracket into corresponding openings in said wing, as best shown in Figures 3 and 4.

Said bracket 10 extends to the margin of the reel and has a bent arm 13 extending across the groove 3 of said reel, as best shown in Figure 6. To one edge of said arm 13 in line with the center of the groove in the reel there is fixed a line guide or eye 14, while to the other edge of said arm the drag spring 15 is connected. The drag spring is secured by screws to 19 to said arm as clearly shown in Figures 1 and 5. Said spring 15 is bowed at 20 and has its free end extending into the groove of the reel to bear against the windings of the fishing line 21 therein. The spring has sufficient resiliency to permit it to always engage the line windings no matter how thick they may lie in the groove of the reel.

I claim:—

1. An attachment for fishing reels comprising a bracket, and a line guide and drag spring mounted on said bracket.

2. An attachment for fishing reels comprising a bracket, a line guide on one edge of said bracket, and a drag spring secured to the other edge of the bracket, said spring extending below said line guide.

3. An attachment for fishing reels comprising a bracket, a line guide mounted on said bracket, a plate secured to the spindle of the reel and adapted to embrace and be secured to a fishing pole, there being a laterally extending wing on said plate, and means for detachably securing said bracket rigidly to said wing.

4. An attachment for fishing reels comprising a bracket, a line guide mounted on said bracket, a plate secured to the spindle of the reel and adapted to be secured to a fishing pole, there being a laterally extending wing on said plate provided with a slot, a bolt on said bracket to engage said slot in the wing, and interlocking members on said wing and bracket for rigidly securing them together for the purpose specified.

In testimony whereof I have signed my name to this specification.

PETER STOFT.